US011909804B2

(12) United States Patent
Magana

(10) Patent No.: US 11,909,804 B2
(45) Date of Patent: Feb. 20, 2024

(54) SELECTIVE VALIDATION OF A PORTION OF A SERVER RESPONSE TO A CLIENT REQUEST

(71) Applicant: Red Hat, Inc., Raleigh, NC (US)

(72) Inventor: Josejulio Martinez Magana, Edmonton (CA)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/572,940

(22) Filed: Jan. 11, 2022

(65) Prior Publication Data
US 2023/0224353 A1 Jul. 13, 2023

(51) Int. Cl.
G06F 15/16 (2006.01)
H04L 67/01 (2022.01)
H04L 9/40 (2022.01)
H04L 67/06 (2022.01)
H04L 67/133 (2022.01)

(52) U.S. Cl.
CPC ............ *H04L 67/01* (2022.05); *H04L 63/306* (2013.01); *H04L 67/06* (2013.01); *H04L 67/133* (2022.05)

(58) Field of Classification Search
CPC ..... H04L 67/01; H04L 67/133; H04L 63/306; H04L 67/06; G06F 40/226; G06F 11/3684; G06F 11/3688; G06F 9/54; G06F 16/2365; G06F 11/3664; G06F 11/3668; G06F 16/245; G06F 16/252; G06F 2221/034
See application file for complete search history.

(56) References Cited

U.S. PATENT DOCUMENTS

| 7,437,374 | B2* | 10/2008 | Chen | G06F 40/131 707/999.102 |
| 7,487,515 | B1* | 2/2009 | Jones | G06F 40/143 715/239 |
| 9,405,532 | B1* | 8/2016 | Sullivan | G06F 9/454 |
| 9,584,378 | B1* | 2/2017 | Adam | G06F 21/577 |
| 11,240,318 | B1* | 2/2022 | Locketz | H04L 67/56 |
| 11,372,840 | B2* | 6/2022 | Johry | G06F 16/2365 |
| 2002/0010867 | A1* | 1/2002 | Schaefer | G06F 16/252 709/229 |
| 2002/0042883 | A1* | 4/2002 | Roux | H04L 69/163 709/227 |
| 2003/0182452 | A1* | 9/2003 | Upton | G06F 9/541 715/236 |

(Continued)

OTHER PUBLICATIONS

"JSON Schema, Partial Updates, Subschema Validation," Downloaded from Internet Dec. 1, 2021, https://groups.google.com/g/json-schema/c/WIsA2qf4zSQ.

Primary Examiner — Suraj M Joshi
Assistant Examiner — Hao H Nguyen
(74) Attorney, Agent, or Firm — Kilpatrick Townsend & Stockton LLP

(57) ABSTRACT

A portion of a server response to a client request can be selectively validated according to some examples described herein. In one example, a system can receive a response from a server to an application programming interface (API) request transmitted by a client application. The response can include target data and other data. The system can determine that the target data is to be validated. In response to determining that the target data is to be validated, the system allow a validation process to be performed on the target data and prevent the validation process from being performed on the other data.

20 Claims, 5 Drawing Sheets

(56) References Cited

U.S. PATENT DOCUMENTS

| | | | |
|---|---|---|---|
| 2004/0088352 A1* | 5/2004 | Kurth | H04L 67/564 |
| | | | 709/229 |
| 2005/0177543 A1* | 8/2005 | Chen | G06F 40/226 |
| 2008/0127097 A1* | 5/2008 | Zhao | G06F 11/3684 |
| | | | 717/124 |
| 2009/0083294 A1* | 3/2009 | Gao | G06F 40/131 |
| 2010/0023471 A1* | 1/2010 | Baldwin | G06F 40/18 |
| | | | 706/47 |
| 2015/0081508 A1* | 3/2015 | Schwall | G06Q 40/04 |
| | | | 705/37 |
| 2015/0278386 A1* | 10/2015 | Jain | G06F 16/83 |
| | | | 715/234 |
| 2018/0082054 A1* | 3/2018 | Khwaja | H04L 63/0428 |
| 2018/0255097 A1* | 9/2018 | Li | H04L 63/1483 |
| 2019/0065406 A1* | 2/2019 | Steiner | H04L 9/3271 |
| 2020/0068400 A1* | 2/2020 | Ramic | H04L 63/0861 |
| 2020/0401506 A1* | 12/2020 | Sathianarayanan | G06F 16/955 |
| 2021/0049657 A1* | 2/2021 | Mimran | H04M 15/00 |
| 2021/0075791 A1* | 3/2021 | Dunjic | H04L 63/0428 |
| 2022/0012097 A1* | 1/2022 | Chaudhary | G06F 9/5027 |
| 2022/0121562 A1* | 4/2022 | Kumar | G06F 11/3696 |

\* cited by examiner

SELECTIVE VALIDATION OF A PORTION OF A SERVER RESPONSE TO A CLIENT REQUEST

TECHNICAL FIELD

The present disclosure relates generally to server responses to client requests in a client-server computer architecture. More specifically, but not by way of limitation, this disclosure relates to validating a selected portion of a dataset provided by a server as a response to an application programming interface (API) request from a client application.

BACKGROUND

A client-server architecture can include a client side with a client device and a server side with a server. The client device may execute a client application to perform some functionality. The client application may interact with the server, which can perform backend operations that support the client application. Examples of the backend operations can include storing, retrieving, and organizing data.

The interactions between the client application and the server can be facilitated using an application programming interface (API). An API can include a defined set of rules that dictate how computers or applications can communicate with one another. Generally, the client application can transmit requests to an API hosted by the server. These requests can be referred to as API requests. The server can receive the API requests and transmit appropriate responses to the client application. For example, the client application can transmit a request for a dataset to the API of the server. In response to receiving the request, the server can obtain the dataset from a database (e.g., on the server side) and transmit the dataset back to the client application.

DETAILED DESCRIPTION

Figure 1:
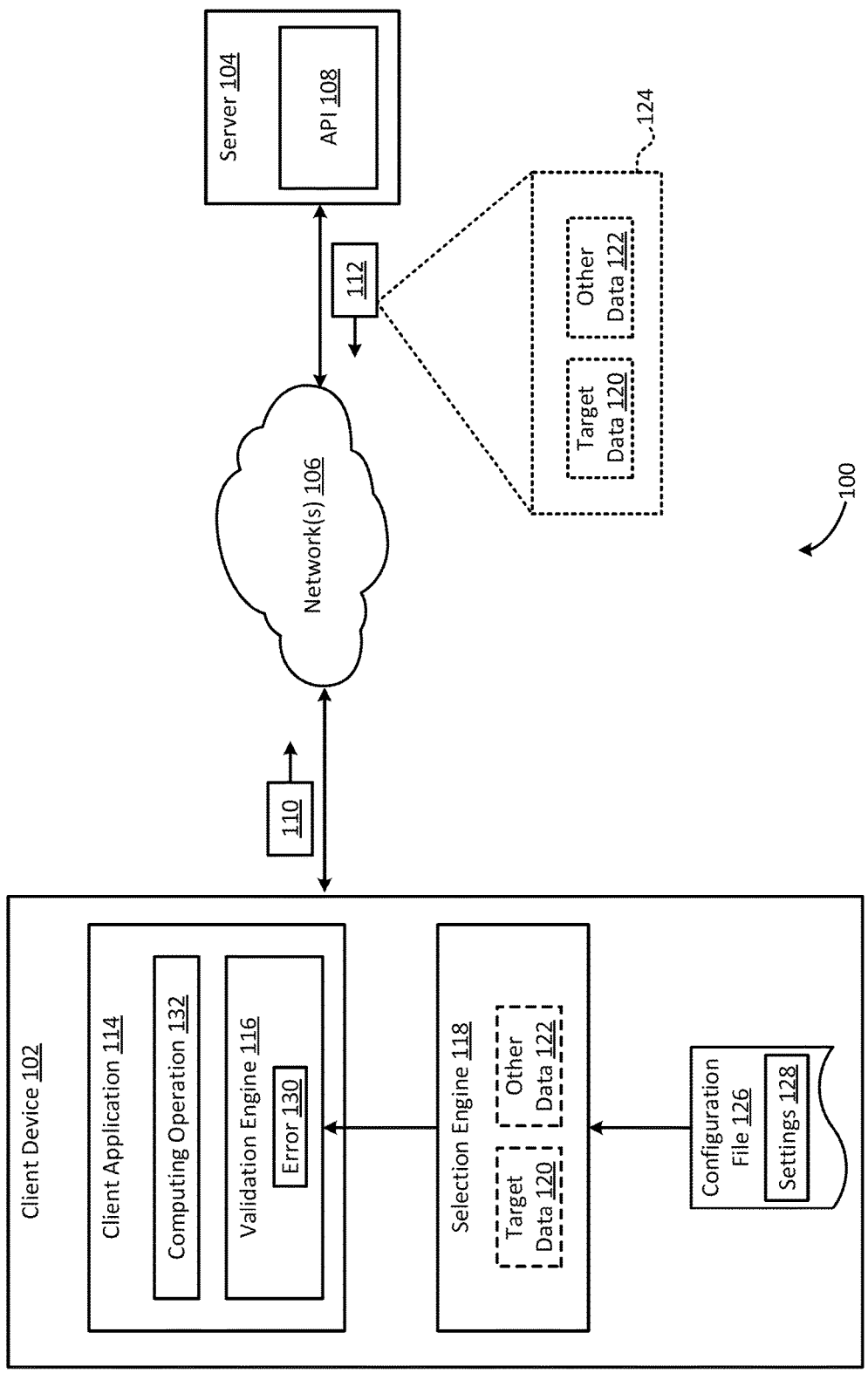
FIG. 1 is a block diagram of an example of a system for selective validation of a portion of a server response in accordance with some aspects of the present disclosure.

In a typical client-server architecture, a client application executing on a client device may need a dataset to perform a particular computing operation. To obtain the dataset, the client device can transmit a request for the dataset to an application programming interface (API) of a server. The server can receive the request and transmit a response that includes the dataset back to the client application. Before the client application uses the received dataset to perform the computing operation, the client application may validate the entire dataset to ensure that it is compatible with the client application. Validating the dataset may involve ensuring that the dataset is properly formatted (e.g., has an appropriate syntax or structure), includes a certain set of parameters, and satisfies other criteria. If the client application determines that any portion of the dataset is invalid, the client application may return an error value. This can negatively impact the functionality of the client application, for example, by preventing the client application from performing the particular computing operation. If the client application determines that the entire dataset is valid, the client application is then allowed to use the dataset in performing the particular computing operation.

While the above validation process can help ensure that a returned dataset is compatible with the client application before the client application attempts to use the dataset, it can also raise problems in certain scenarios. For example, APIs can undergo revision over time. An older version of an API may be programmed to return a first set of parameters in response to a particular API request, while a newer version of the API may be programmed to return a second set of parameters in response to the same API request. If the second set of parameters includes more, fewer, or different parameters than is expected by the client application, the validation process may fail. The main approach currently used to fix this problem involves a developer creating a software update that accounts for these API changes and then providing the software update to any number of client devices running the client application. This can be a time consuming, repetitive, and tedious manual process that may be error prone. And each time a new software update is released, the client devices may need to download the software update from a host server and install the software update, which can consume the network bandwidth, processing power, storage, and memory of both the host server and the client devices.

Some examples of the present disclosure can overcome one or more of the abovementioned problems by allowing for a validation process to be executed on a selected subpart of a dataset (e.g., rather than the entire dataset) returned from a server in response to an API request by a client application. The particular subpart of the dataset to be validated can be selected and dynamically updated by modifying one or more settings, which may be located in a configuration file or elsewhere. A remainder of the dataset can be ignored and thus may not undergo the validation process. With this approach, the validation process can be customized in a way that is easier and faster as compared to using software updates. This approach can also mitigate the negative impacts of API revisions on client-application functionality, without requiring the time and effort to create a full software update and without requiring the consumption of computing resources associated with hosting, downloading, and installing such updates.

As one particular example, a client device can include a client application. The client application can include a validation engine for executing a validation process on a dataset returned from a server in response to an API request. The validation engine may be built into the client application, for example embedded in the source code of the client application. The client device can also include a selection engine that can control which part or parts of the dataset returned from the server are to be input to the validation engine. The selection engine may or may not be part of the client application. In some examples, the client application can transmit a request for a target dataset to an API associated with a server. The server can receive the request and provide a response that includes the target dataset to the client device. The selection engine can intercept the response, extract a selected portion of the target dataset, and provide the selected portion of the target dataset to the validation engine to undergo the validation process. The particular portion of the target dataset that is selected can be dictated by settings in a configuration file or elsewhere. The selection engine can ignore a remainder of the target dataset, thereby blocking the remainder of the target dataset from undergoing the validation process. Blocking the remainder of the target dataset from undergoing the validation process can prevent the client application from breaking, for example if the target dataset includes more parameters than is expected by the validation engine.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for selective validation of a portion of a server response in accordance with some aspects of the present disclosure. The system 100 includes a client device 102, such as a laptop computer, desktop computer, tablet, e-reader, mobile phone, or wearable device. The client device 102 can execute a client application 114. Examples of the client application 114 can include a game such as a mobile game; a utility application such as a word processor, a website browser, or an e-mail client; or a communication application such as a text chat application or a video conferencing application.

During operation, the client application 114 can interact with a server 104 via one or more networks 106, such as a local area network or the Internet. The client application 114 can interact with the server 104 using a request-response model facilitated by an API 108. The API 108 may be hosted by the server 104 or may otherwise be associated with the server 104. In particular, the client application 114 can transmit a request 110 for a dataset 124 to the API 108 associated with the server 104. The server 104 can receive the request 110 via the API 108, obtain the requested dataset 124, and transmit a response 112 back to the client device 102 that includes the requested dataset 124. The server 104 may obtain the requested dataset 124 from any suitable source, for example from a database or from another server.

The dataset 124 can include target data 120 for use by the client application 114 in performing a particular computing operation 132, as well as other data 122 that is extraneous to performing the particular computing operation 132. This may occur because an older version of the API 108 may have only returned the target data 120, but over time, the API 108 may have been updated to also incorporate the other data 122 into the response 112 for various reasons. The inclusion of the other data 122 may cause problems during a validation process, since the other data 122 may not be an expected part of the response 112. For example, the client application 114 may have been programmed to work with the older version of the API 108 rather than the newer version of the API 108, and therefore the client application 114 may not expect the other data 122 in the response 112.

To mitigate the abovementioned problems, the client device 102 may also include a selection engine 118. The selection engine 118 is software that can intercept the response 112 prior to the response 112 reaching a validation engine 116 configured to implement the validation process. After intercepting the response 112, the selection engine 118 can analyze the dataset 124 to identify which portions should be forwarded to the validation engine 116 and which portions should be ignored. For example, the selection engine 118 can access a configuration file 126 that includes settings 128 specifying which portion(s) of the dataset 124 correspond to target data 120 that is to be forwarded to the validation engine 116. The settings 128 may additionally or alternatively specify which portion(s) of the dataset 124 correspond to other data 122 that is to be ignored. Based on the settings 128, the selection engine 118 can parse the dataset 124 into the target data 120 and the other data 122. The selection engine 118 can then forward the target data 120 to the validation engine 116 and prevent transmission of the other data 122 to the validation engine 116.

The validation engine 116 is software that can perform the validation process on the target data 120 received from the selection engine 118. The validation process can involve determining whether the target data 120 satisfies one or more predefined criteria. One example of the predefined criteria can include a formatting criteria. The target data 120 can be deemed to satisfy the formatting criteria if the target data 120 conforms to a predesignated format, such as a JavaScript Object Notation (JSON) or eXtensible Markup Language (XML) format. The target data 120 can be deemed not to satisfy the formatting criteria if the target data 120 does not conform to the predesignated format. The validation engine 116 may be preprogrammed to analyze the target data 120 for conformity with the predesignated format. Another example of the predefined criteria can include a completeness criteria. The target data 120 can be deemed to satisfy the completeness criteria if the target data 120 has a specific, predesignated set of parameters. The target data 120 can be deemed not to satisfy the completeness criteria if the target data 120 excludes at least one parameter in the predesignated set of parameters. The validation engine 116 may be preprogrammed to analyze the target data 120 to ensure it has all parameters in the predesignated set of parameters.

The validation engine 116 can determine that the target data 120 is valid if the target data 120 satisfies the one or more predefined criteria. In response to determining that the target data 120 is valid, the validation engine 116 can return the target data 120 to the client application 114 for use in performing the particular computing operation 132. In response to determining that the target data 120 is invalid, the validation engine 116 can return an error message 130 to the client application 114. This may prevent the client application 114 from performing the particular computing operation 132.

By positioning the selection engine 118 as an intermediary between the validation engine 116 and the server 104, the selection engine 118 can help control which part or parts of the server's response 112 are delivered to the validation engine 116. This filtering and control mechanism can reduce the likelihood of the validation engine 116 determining that the response 112 is invalid, which in turn can improve operation of the client application 114 (e.g., because the client application 114 can execute computing operations it may otherwise be unable to execute if the response 112 is deemed invalid).

Although FIG. 1 shows a certain number and arrangement of components, this is intended to be illustrative and non-limiting. Other examples may include more components, fewer components, different components, or a different arrangement of the components shown in FIG. 1. For instance, although the engines 116, 118 are shown in FIG. 1 as separate components, in other examples the selection engine 118 can include the validation engine 116 (or vice-versa). Thus, the selection engine 118 may implement at least some of the functionality of the validation engine 116 (or vice-versa) in other examples.

Figure 2:
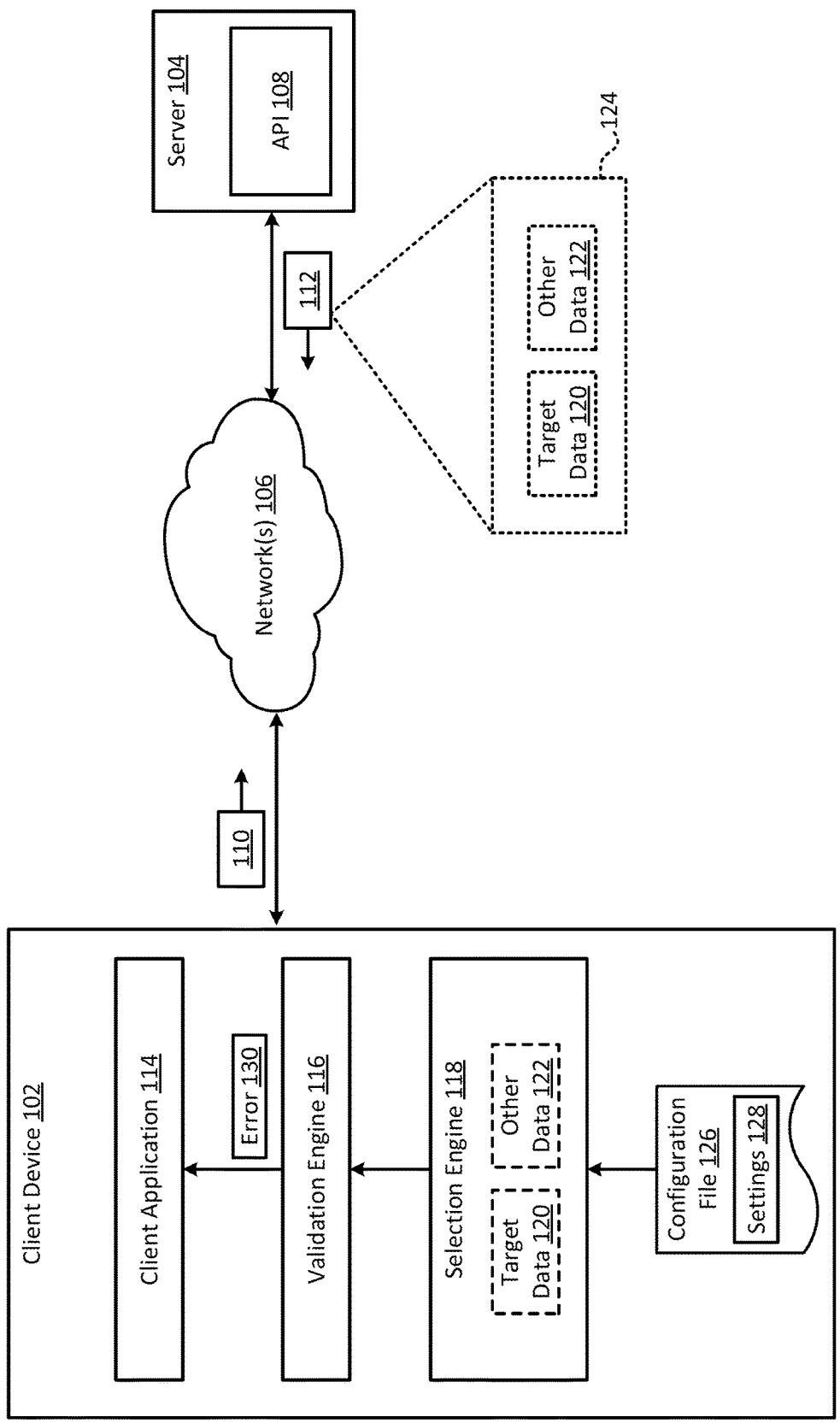
FIG. 2 is a block diagram of another example of a system in which a selection engine and a validation engine are separate from a client application according to some aspects of the present disclosure.

FIG. 2 shows another example in which the validation engine 116 is separate from the client application 114. In this example, the validation engine 116 can execute the validation process on the target data 120. Depending on the results of the validation process, the validation engine 116 can either forward the target data 120 to the client application 114 or transmit an error message 130 to the client application 114.

Figure 3:
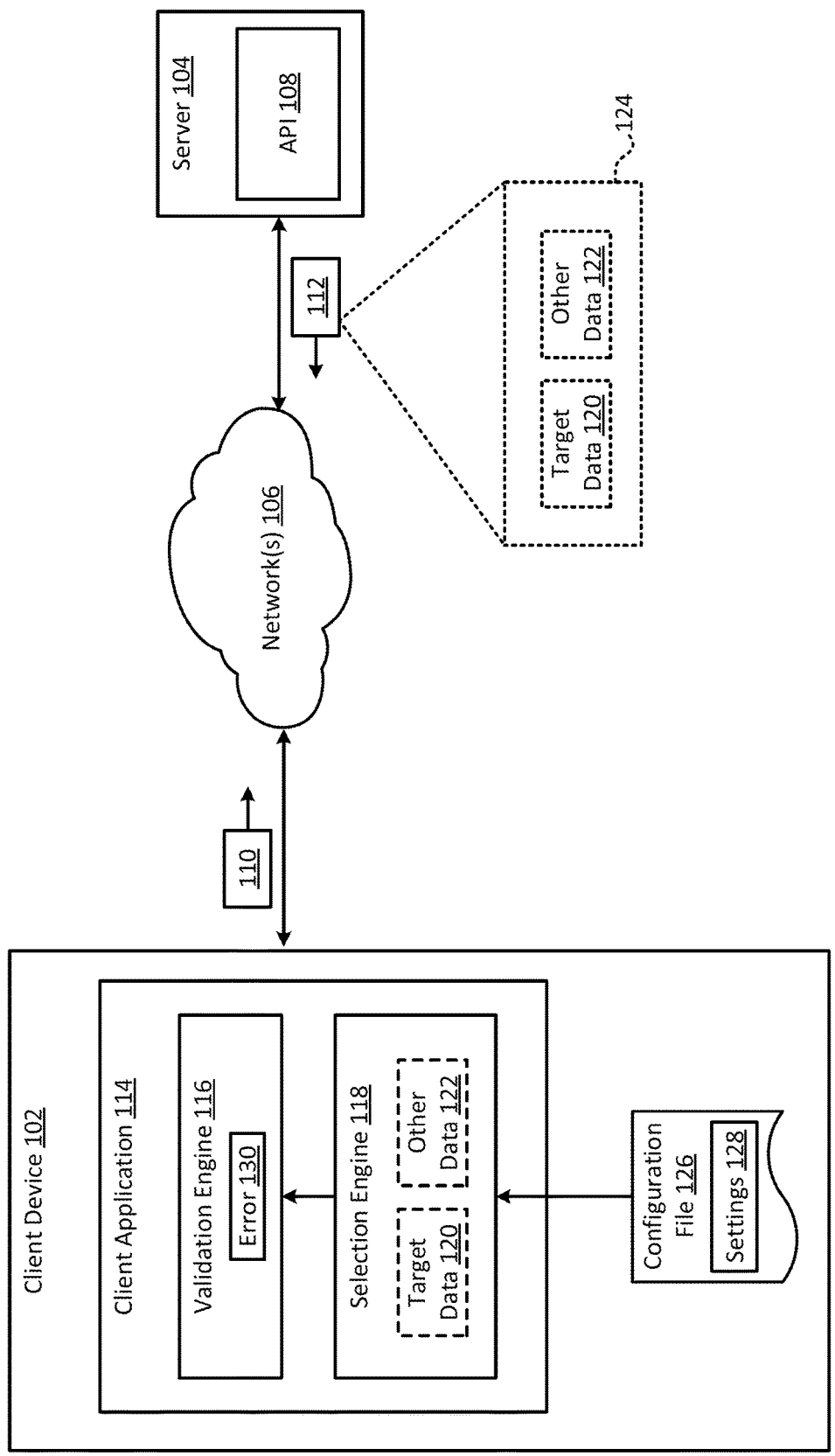
FIG. 3 is a block diagram of another example of a system in which a selection engine and a validation engine are part of a client application in accordance with some aspects of the present disclosure.

FIG. 3 shows another example in which the validation engine 116 and the selection engine 118 are both parts of the client application 114. In this example, the client application 114 can receive the response 112 from the server 104 and pass the response 112 to the selection engine 118 (e.g., rather than the validation engine 116). The selection engine 118 can then identify the target data 120 in the response 112 and forward the target data 120 to the validation engine 116. Upon receiving the target data 120, the validation engine 116 can execute the validation process on the target data 120. Depending on the results of the validation process, the validation engine 116 can either return the target data 120 or return an error message 130.

Figure 4:
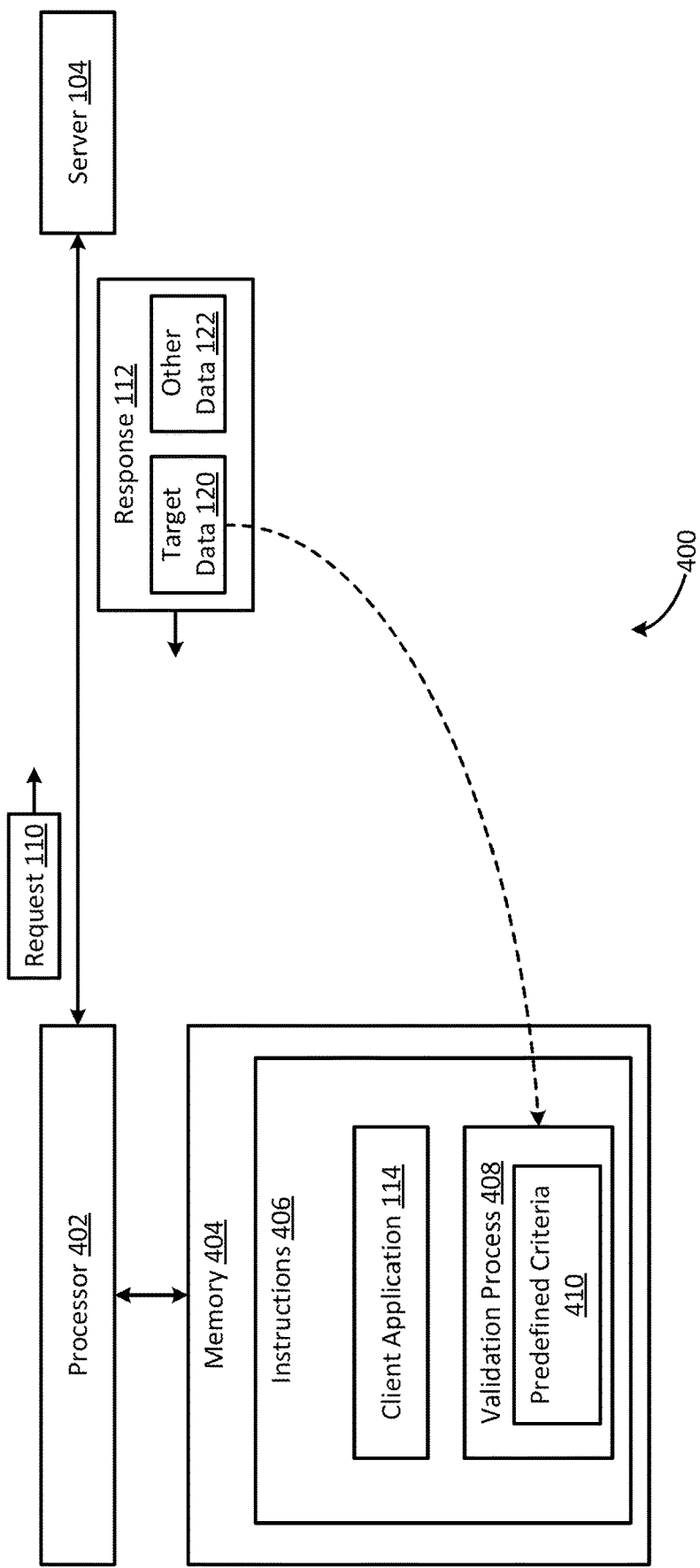
FIG. 4 is a block diagram of another example of a system according to some aspects of the present disclosure.

FIG. 4 shows yet another example of a system 400 according to some aspects of the present disclosure. The system 400 includes a processor 402 communicatively coupled to a memory 404. In some examples, the processor 402 and the memory 404 may be parts of the same computing device, such as the client device 102 of FIG. 1. In other examples, the processor 402 and the memory 404 may be distributed from (e.g., remote to) one another.

The processor 402 is hardware that can include one processing device or multiple processing devices. Non-limiting examples of the processor 402 include a Field-Programmable Gate Array (FPGA), an application-specific integrated circuit (ASIC), or a microprocessor. The processor 402 can execute instructions 406 stored in the memory 404 to perform computing operations. In some examples, the instructions 406 may correspond to the client application 114, the selection engine 118, the validation engine 116, or any combination thereof. The instructions 406 may include processor-specific instructions generated by a compiler or an interpreter from code written in any suitable computer-programming language, such as C, C++, C #, Python, or Java.

The memory 404 can include one memory device or multiple memory devices. The memory 404 can be volatile or can be non-volatile, such that it can retain stored information when powered off. Some examples of the memory 404 can include electrically erasable and programmable read-only memory (EEPROM), flash memory, or any other type of non-volatile memory. At least some of the memory 404 includes a non-transitory computer-readable medium from which the processor 402 can read instructions. A computer-readable medium can include electronic, optical, magnetic, or other storage devices capable of providing the processor 402 with computer-readable instructions or other program code. Some examples of a computer-readable medium include magnetic disks, memory chips, ROM, random-access memory (RAM), an ASIC, a configured processor, optical storage, or any other medium from which a computer processor can read the instructions 406.

In some examples, the processor 402 can execute the instructions 406 to perform some or all of the functionality described herein. For example, the processor 402 can receive a response 112 from a server 104 to an application programming interface (API) request 110 transmitted by a client application 114. The response 112 can include target data 120 and other data 122. The processor 402 can determine that the target data 120 is to be validated. In response to determining that the target data 120 is to be validated, the processor 402 can allow a validation process 408 to be performed on the target data 120 and prevent the validation process 308 from being performed on the other data 122. The validation process 408 can involve determining whether the target data 120 satisfies one or more predefined criteria 410.

Figure 5:
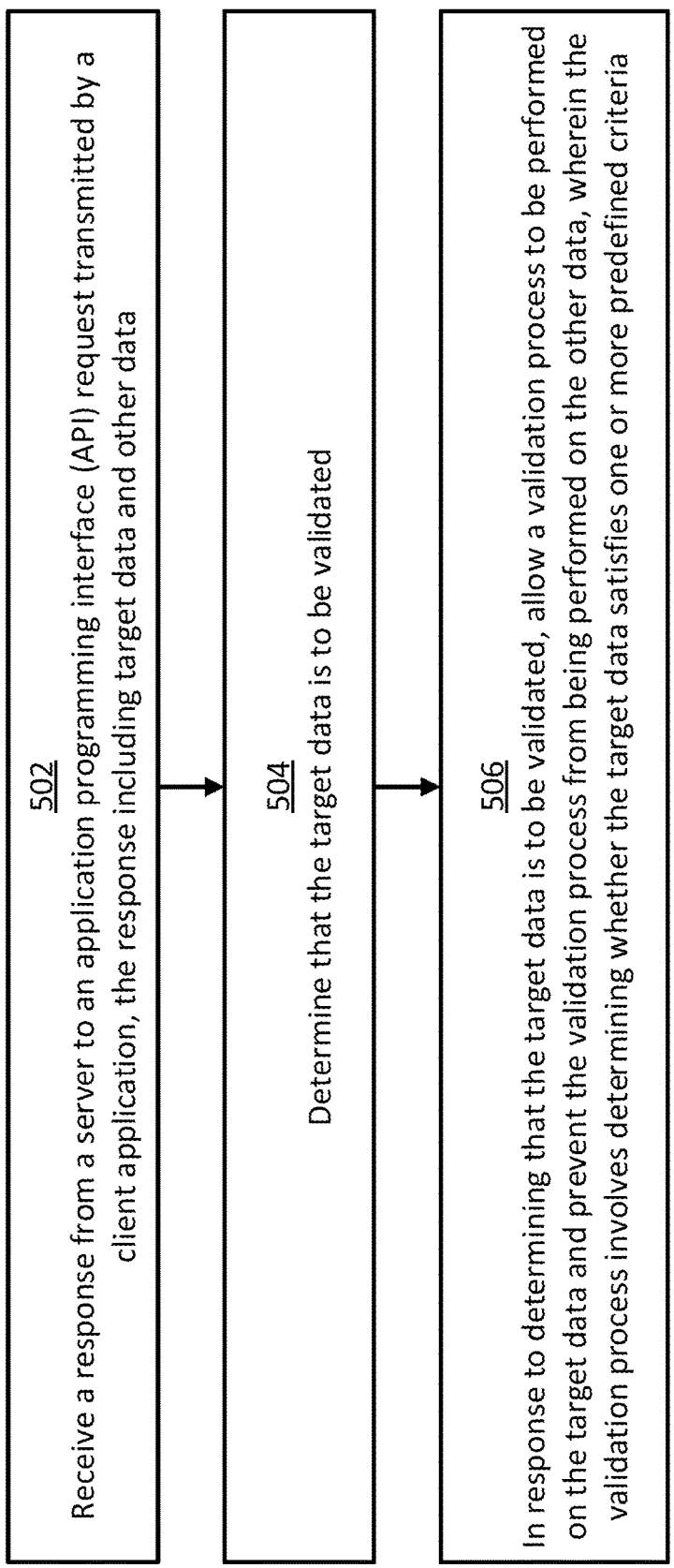
FIG. 5 is a flow chart of another example of a process for selective validation of a portion of a server response in accordance with some aspects of the present disclosure.

FIG. 5 is a flow chart of another example of a process for selective validation of a portion of a server response in accordance with some aspects of the present disclosure. Other examples may involve more steps, fewer steps, different steps, or a different order of the steps than are shown in FIG. 5. The steps of FIG. 5 will now be described below with reference to the components of FIGS. 1-4 described above.

In block 502, the processor 402 receives a response 112 from a server 104 to an application programming interface (API) request 110 transmitted by a client application 114. The processor 402 can receive the response 112 from the server 104 via one or more networks 106. The API request 110 can be a single request and the response 112 can be a single response to the single request. The response 112 can include a dataset 124 that contains target data 120 and other data 122.

In block 504, the processor 402 determines that the target data 120 is to be validated. For example, the processor 402 can determine that the target data 120 is to be validated based on settings 128, which may be stored in a configuration file 126 or elsewhere. The settings 128 may be set by a user prior to, or during, execution of the client application 114. For example, the settings 128 may be updated while the client application 114 is running, so that the data selected for validation is dynamically changeable without having to shutdown the client application 114. This may yield advantages over alternative approaches (e.g., applying an update to the client application 114) that may require the client application 114 to be shutdown, resulting downtime in which the client application 114 is inoperable.

In some examples, the processor 402 can additionally or alternatively determine that the other data 122 is to be ignored. For example, the processor 402 can determine that the other data 122 is to be ignored based on the settings 128.

In block 506, the processor 402 allows a validation process 408 to be performed on the target data 120 and prevents the validation process 308 from being performed on the other data 122. The processor can perform these operations in response to determining that the target data 120 is to be validated. The validation process 408 can involve determining whether the target data 120 satisfies one or more predefined criteria 410. Examples of the predefined criteria 410 can include a formatting criteria and a completeness criteria.

In some aspects, a selected portion of a dataset provided by a server as a response to a request from a client application can be validated according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to: receive a response from a server to an application programming interface (API) request transmitted by a client application, the response including target data and other data; determine that the target data is to be validated; and in response to determining that the target data is to be validated, allow a validation process to be performed on the target data and prevent the validation process from being performed on the other data, wherein the validation process involves determining whether the target data is satisfies one or more predefined criteria.

Example #2: The non-transitory computer-readable medium of Example #1, wherein the validation process is configured to determine whether the target data is compatible with the client application.

Example #3: The non-transitory computer-readable medium of any of Examples #1-2, wherein the one or more predefined criteria include a formatting criteria, and wherein the validation process is configured to determine whether the target data satisfies the formatting criteria by determining whether the target data conforms to a predesignated format.

Example #4: The non-transitory computer-readable medium of any of Examples #1-3, wherein the one or more predefined criteria include a completeness criteria, and wherein the validation process is configured to determine that the target data satisfies the completeness criteria based on the target data including a predesignated set of parameters.

Example #5: The non-transitory computer-readable medium of any of Examples #1-4, wherein the program code corresponds to a selection engine that is included in the client application.

Example #6: The non-transitory computer-readable medium of any of Examples #1-4, wherein the program code corresponds to a selection engine that is separate from the client application, the selection engine being executable to intercept the response from the server prior to response reaching the client application.

Example #7: The non-transitory computer-readable medium of Example #6, wherein the selection engine is further executable by the processor for causing the processor to: execute the validation process to determine whether the target data satisfies the one or more predefined criteria; in response to determining that the target data satisfies the one or more predefined criteria, forward the target data to the client application for use by the client application in executing one or more computing operations; and in response to determining that the target data fails to satisfy the one or more predefined criteria, transmit an error message to the client application.

Example #8: The non-transitory computer-readable medium of Example #6, wherein the selection engine is further executable by the processor for causing the processor to: forward the target data to the client application, the client application being configured to perform the validation process on the target data; and prevent the other data from being forwarded to the client application.

Example #9: The non-transitory computer-readable medium of any of Examples #1-8, wherein the program code is further executable by the processor for causing the processor to: retrieve one or more settings from a configuration file by accessing the configuration file; determine that the target data is to be validated based on the one or more settings; and determine that the other data is to be ignored based on the one or more settings.

Example #10: The non-transitory computer-readable medium of any of Examples #1-9, wherein the client application is configured to transmit the API request to the server, the API request being for retrieving a dataset that includes the target data and the other data from the server, and the response including the dataset.

Example #11: A method comprising: receiving, by a processor, a response from a server to an application programming interface (API) request transmitted by a client application, the response including target data and other data; determining, by the processor, that the target data is to be validated; and in response to determining that the target data is to be validated, allowing, by the processor, a validation process to be performed on the target data and preventing the validation process from being performed on the other data, wherein the validation process involves determining whether the target data satisfies one or more predefined criteria.

Example #12: The method of Example #11, wherein the validation process is configured to determine whether the target data is compatible with the client application.

Example #13: The method of any of Examples #11-12, wherein the one or more predefined criteria include a completeness criteria, and wherein the validation process is configured to determine that the target data fails to satisfy the completeness criteria based on determining that the target data excludes at least one parameter of a predesignated set of parameters.

Example #14: The method of any of Examples #11-13, wherein the processor executes a selection engine that is part of the client application to: receive the response; determine that the target data is to be validated; allow the validation process to be performed on the target data; and prevent the validation process from being performed on the other data.

Example #15: The method of any of Examples #11-13, wherein the processor executes a selection engine that is separate from the client application to: intercept the response from the server prior to response reaching the client application; determine that the target data is to be validated; allow the validation process to be performed on the target data; and prevent the validation process from being performed on the other data.

Example #16: The method of Example #15, further comprising: forwarding, by the selection engine, the target data to the client application, the client application being configured to perform the validation process on the target data; and preventing, by the selection engine, the other data from being forwarded to the client application.

Example #17: The method of any of Examples #11-15 and 17, further comprising: executing, by a validation engine, the validation process to determine whether the target data satisfies the one or more predefined criteria; in response to determining that the target data satisfies the one or more predefined criteria, providing, by the validation engine, the target data to the client application for use by the client application in executing one or more computing operations; and in response to determining that the target data fails to satisfy the one or more predefined criteria, providing, by the validation engine, an error message to the client application.

Example #18: The method of any of Examples #11-17, further comprising: retrieving, by the processor, one or more settings from a configuration file by accessing the configuration file; determining, by the processor, that the target data is to be validated based on the one or more settings; and determining, by the processor, that the other data is to be ignored based on the one or more settings.

Example #19: The method of any of Examples #11-118, wherein the client application is configured to transmit the API request to the server, the API request being for retrieving a dataset that includes the target data and the other data from the server, and the response including the dataset.

Example #20: A system comprising: a processor; and a memory including instructions that are executable by the processor for causing the processor to: receive a response from a server to an application programming interface (API) request transmitted by a client application, the response including target data and other data; determine that the target data is to be validated; and in response to determining that the target data is to be validated, allow a validation process to be performed on the target data and prevent the validation process from being performed on the other data, wherein the validation process involves determining whether the target data satisfies one or more predefined criteria.

Example #21: A non-transitory computer-readable medium comprising program code for a client application, the client application being executable by a processor for causing the processor to: transmit an application programming interface (API) request to a server for retrieving a dataset from the server; receive the dataset in a response to the API request from the server; determine that target data in the dataset is to be validated and that other data in the dataset is to be ignored; in response to determining that the target data is to be validated, execute a validation process to determine whether the target data satisfies one or more predefined criteria; and in response to determining that the other data is to be ignored, prevent the validation process from being executed on the other data.

Example #22: The non-transitory computer-readable medium of Example #21, wherein the client application includes a selection engine that is executable by the processor to: determine that the target data in the dataset is to be validated; and determine that the other data in the dataset is to be ignored.

Example #23: The non-transitory computer-readable medium any of Examples #21-22, wherein the client application includes a validation engine that is executable by the processor to: determine, by executing the validation process on the target data, that the target data fails to satisfy the one or more predefined criteria; and in response to determining that the target data fails to satisfy the one or more predefined criteria, return an error message to the client application.

Example #24: The non-transitory computer-readable medium any of Examples #21-23, wherein the client application includes a validation engine that is executable by the processor to: determine, by executing the validation process on the target data, that the target data satisfies the one or more predefined criteria; and in response to determining that the target data satisfies the one or more predefined criteria, return the target data to the client application for use in performing one or more computing operations.

Example #25: The non-transitory computer-readable medium any of Examples #21-24, wherein the client application is further executable by the processor for causing the processor to: retrieve one or more settings from a configuration file by accessing the configuration file; determine that the target data is to be validated based on the one or more settings; and determine that the other data is to be ignored based on the one or more settings.

Example #26: A method comprising: transmitting, by a client application executing on a processor, an application programming interface (API) request to a server for retrieving a dataset from the server; receiving, by the client application, the dataset in a response to the API request from the server; determining, by the client application, that target data in the dataset is to be validated and that other data in the dataset is to be ignored; in response to determining that the target data is to be validated, executing, by the client application, a validation process to determine whether the target data satisfies one or more predefined criteria; and in response to determining that the other data is to be ignored, preventing, by the client application, the validation process from being executed on the other data.

Example #27: The method of Example #26, wherein the client application includes a selection engine that is executable by the processor to determine that the target data in the dataset is to be validated and that the other data in the dataset is to be ignored.

Example #28: The method of any of Examples #26-27, wherein the client application includes a validation engine, and further comprising: determining, by the validation engine executing the validation process on the target data, that the target data fails to satisfy the one or more predefined criteria; and in response to determining that the target data fails to satisfy the one or more predefined criteria, returning, by the validation engine, an error message to the client application.

Example #29: The method of any of Examples #26-27, wherein the client application includes a validation engine, and further comprising: determining, by the validation engine executing the validation process on the target data, that the target data satisfies the one or more predefined criteria; and in response to determining that the target data satisfies the one or more predefined criteria, returning, by the validation engine, the target data to the client application for use in performing one or more computing operations.

Example #30: The method of any of Examples #26-29, further comprising: retrieving one or more settings from a configuration file by accessing the configuration file; determining that the target data is to be validated based on the one or more settings; and determining that the other data is to be ignored based on the one or more settings.

Example #31: A non-transitory computer-readable medium comprising program code for a selection engine that is separate from a client application, the selection engine being executable by a processor for causing the processor to: intercept a response from a server to an application programming interface (API) request issued by the client application, the API request being for retrieving a dataset from the server, and the response including the dataset; determine that target data in the dataset is to be validated and that other data in the dataset is to be ignored; in response to determining that the target data is to be validated, forward the target data to a validation engine configured to perform a validation process on the target data, the validation process involving determining whether the target data satisfies one or more predefined criteria; and in response to determining that the other data is to be ignored, prevent the other data from being forwarded to the validation engine.

Example #32: The non-transitory computer-readable medium of Example #31, wherein the selection engine, the validation engine, and the client application are located on a client device.

Example #33: The non-transitory computer-readable medium of any of Examples #31-32, wherein the client application includes the validation engine.

Example #34: The non-transitory computer-readable medium of any of Examples #31-33, wherein the validation engine is configured to: determine whether the target data satisfies the one or more predefined criteria by executing the validation process on the target data; in response to determining that the target data fails to satisfy the one or more predefined criteria, return an error message to the client application; and in response to determining that the target data satisfies the one or more predefined criteria, return the target data to the client application.

Example #35: The non-transitory computer-readable medium of any of Examples #31-34, wherein the selection engine is further executable by the processor for causing the processor to: retrieve one or more settings from a configuration file by accessing the configuration file; determine that the target data is to be validated based on the one or more settings; and determine that the other data is to be ignored based on the one or more settings.

Example #36: A method comprising: intercepting, by a selection engine that is separate from a client application and executing on a processor, a response from a server to an application programming interface (API) request issued by the client application, the API request being for retrieving a dataset from the server, and the response including the dataset; determining, by the selection engine, that target data in the dataset is to be validated and that other data in the dataset is to be ignored; in response to determining that the target data is to be validated, forwarding, by the selection engine, the target data to a validation engine configured to perform a validation process on the target data, the validation process involving determining whether the target data satisfies one or more predefined criteria; and in response to determining that the other data is to be ignored, preventing, by the selection engine, the other data from being forwarded to the validation engine.

Example #37: The method of Example #36, wherein the selection engine, the validation engine, and the client application are located on a client device.

Example #38: The method of any of Examples #36-37, wherein the client application includes the validation engine.

Example #39: The method of any of Examples #36-38, wherein the validation engine is configured to: determine whether the target data satisfies the one or more predefined criteria by executing the validation process on the target data; in response to determining that the target data fails to satisfy the one or more predefined criteria, return an error message to the client application; and in response to determining that the target data satisfies the one or more predefined criteria, return the target data to the client application.

Example #40: The method of any of Examples #36-39, further comprising: retrieving, by the selection engine, one or more settings from a configuration file by accessing the configuration file; determining, by the selection engine, that the target data is to be validated based on the one or more settings; and determining, by the selection engine, that the other data is to be ignored based on the one or more settings.

Example #41: A system comprising: means for receiving a response from a server to an application programming interface (API) request transmitted by a client application, the response including target data and other data; means for determining that the target data is to be validated and that the other data is to be ignored; and means for, in response to determining that the target data is to be validated and that the other data is to be ignored, allowing a validation process to be performed on the target data and preventing the validation process from being performed on the other data, wherein the validation process involves determining whether the target data satisfies one or more predefined criteria.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example described herein can be combined with any other example to yield further examples.

The invention claimed is:

1. A non-transitory computer-readable medium comprising program code that is executable by a processor of a client device for causing the client device to:
receive, at a selection engine, a response from a server to an application programming interface (API) request transmitted by a client application on the client device, the response including target data and other data in a particular format;
determine, using the selection engine, that the target data is to be validated and that the other data is not to be validated;
provide, from the selection engine, the target data and not the other data to a validation engine in response to determining that the target data and not the other data is to be validated;
perform, using the validation engine, a validation process on the target data and not on the other data, wherein the validation process involves determining whether the target data satisfies one or more predefined criteria; and
in response to determining that the target data is valid, provide, from the validation engine, the validated target data in the particular format for use by the client application.

2. The non-transitory computer-readable medium of claim 1, wherein the validation process is configured to determine whether the target data is compatible with the client application.

3. The non-transitory computer-readable medium of claim 1, wherein the one or more predefined criteria include a formatting criteria, and wherein the validation process is configured to determine whether the target data satisfies the formatting criteria by determining whether the target data conforms to a predesignated format.

4. The non-transitory computer-readable medium of claim 1, wherein the one or more predefined criteria include a completeness criteria, and wherein the validation process is configured to determine that the target data satisfies the completeness criteria based on the target data including a predesignated set of parameters.

5. The non-transitory computer-readable medium of claim 1, wherein the client application includes the selection engine, the selection engine being executable by the processor to:
   parse the response into the target data and the other data; and
   provide the target data to the validation engine on the client device.

6. The non-transitory computer-readable medium of claim 1, wherein the client application is separate from the selection engine on the client device, the selection engine being executable by the processor to:
   intercept the response from the server prior to response reaching the client application; and
   parse the response into the target data and the other data.

7. The non-transitory computer-readable medium of claim 6, wherein the selection engine includes the validation engine, the validation engine being executable by the processor for causing the processor to:
   execute the validation process to determine whether the target data satisfies the one or more predefined criteria;
   in response to determining that the target data satisfies the one or more predefined criteria, forward the target data to the client application for use by the client application in executing one or more computing operations; and
   in response to determining that the target data fails to satisfy the one or more predefined criteria, transmit an error message to the client application.

8. The non-transitory computer-readable medium of claim 6, wherein the client application includes the validation engine, and wherein the selection engine is further executable by the processor for causing the processor to:
   forward the target data and not the other data to the validation engine of the client application.

9. The non-transitory computer-readable medium of claim 1, wherein the program code is further executable by the processor for causing the processor to:
   retrieve one or more settings from a configuration file by accessing the configuration file;
   determine that the target data is to be validated based on the one or more settings; and
   determine that the other data is to be ignored based on the one or more settings.

10. The non-transitory computer-readable medium of claim 1, wherein the client application is configured to transmit the API request to the server, the API request being for retrieving a dataset that includes the target data and the other data from the server, and the response including the dataset.

11. A method comprising:
   receiving, by a selection engine executing on a processor of a client device, a response from a server to an application programming interface (API) request transmitted by a client application on the client device, the response including target data and other data in a particular format;
   determining, by the selection engine, that the target data is to be validated and that the other data is not to be validated;
   providing, by the selection engine, the target data and not the other data to a validation engine in response to determining that the target data and not the other data is to be validated;
   performing, by the validation engine executing on the processor, a validation process on the target data and not on the other data, wherein the validation process involves determining whether the target data satisfies one or more predefined criteria; and
   in response to determining that the target data is valid, providing, by the validation engine, the validated target data in the particular format for use by the client application.

12. The method of claim 11, wherein the validation process is configured to determine whether the target data is compatible with the client application.

13. The method of claim 11, wherein the one or more predefined criteria include a completeness criteria, and wherein the validation process is configured to determine that the target data fails to satisfy the completeness criteria based on determining that the target data excludes at least one parameter of a predesignated set of parameters.

14. The method of claim 11, wherein the client application includes the selection engine, and further comprising:
   receiving, by the selection engine, the response;
   parsing, by the selection engine, the response into the target data and the other data;
   determining, by the selection engine, that the target data is to be validated; and
   in response to determining that the target data is to be validated, providing, by the selection engine, the target data to the validation engine on the client device.

15. The method of claim 11, wherein the selection engine is separate from the client application, and further comprising:
   intercepting, by the selection engine, the response from the server prior to response reaching the client application;
   parsing, by the selection engine, the response into the target data and the other data;
   determining, by the selection engine, that the target data is to be validated; and
   in response to determining that the target data is to be validated, providing, by the selection engine, the target data to the validation engine on the client device.

16. The method of claim 15, further comprising:
   forwarding, by the selection engine, the target data and not the other data to the client application, the client application including the validation engine that is executable to perform the validation process on the target data.

17. The method of claim 11, further comprising:
   executing, by the validation engine on the client device, the validation process to determine whether the target data satisfies the one or more predefined criteria;
   in response to determining that the target data satisfies the one or more predefined criteria, providing, by the validation engine, the target data for use by the client application in executing one or more computing operations; and
   in response to determining that the target data fails to satisfy the one or more predefined criteria, providing, by the validation engine, an error message to the client application.

18. The method of claim 11, further comprising:
   retrieving, by the selection engine, one or more settings from a configuration file by accessing the configuration file;
   determining, by the selection engine, that the target data is to be validated based on the one or more settings; and
   determining, by the selection engine, that the other data is to be ignored based on the one or more settings.

19. The method of claim 11, further comprising:
transmitting, by the client application, the API request to the server, the API request being for retrieving a dataset that includes the target data and the other data from the server, and the response including the dataset.

20. A client device comprising:
a processor; and
a memory including instructions that are executable by the processor for causing the client device to:
   receive, at a selection engine, a response from a server to an application programming interface (API) request transmitted by a client application on the client device, the response including target data and other data in a particular format;
   determine, using the selection engine, that the target data is to be validated;
   provide, from the selection engine, the target data and not the other data to a validation engine in response to determining that the target data and not the other data is to be validated;
   perform, using the validation engine, a validation process on the target data and not the other data, wherein the validation process involves determining whether the target data satisfies one or more predefined criteria; and
in response to determining that the target data is valid, provide, from the validation engine, the validated target data in the particular format for use by the client application.

* * * * *